US007609873B2

(12) United States Patent
Foth et al.

(10) Patent No.: US 7,609,873 B2
(45) Date of Patent: Oct. 27, 2009

(54) METHOD FOR PROCESSING CHECKS PRIOR TO ELECTRONIC DEPOSIT

(75) Inventors: Thomas J. Foth, Trumbull, CT (US); Jeffrey D. Pierce, Sandy Hook, CT (US)

(73) Assignee: Pitney Bowes Inc., Stamford, CT (US)

( * ) Notice: Subject to any disclaimer, the term of this patent is extended or adjusted under 35 U.S.C. 154(b) by 672 days.

(21) Appl. No.: 11/295,979

(22) Filed: Dec. 7, 2005

(65) Prior Publication Data

US 2007/0127805 A1    Jun. 7, 2007

(51) Int. Cl.
*G06K 9/00* (2006.01)

(52) U.S. Cl. .......................... 382/138; 194/210; 283/58; 235/17

(58) Field of Classification Search ................. 382/100, 382/135, 136, 137, 138, 139, 140; 194/210; 235/17; 705/50, 51, 80; 283/57, 58, 59
See application file for complete search history.

(56) References Cited

U.S. PATENT DOCUMENTS

| 5,040,226 | A | * | 8/1991 | Elischer et al. ............. 382/138 |
| 5,040,227 | A | * | 8/1991 | Lyke et al. ................... 382/138 |
| 5,187,351 | A | * | 2/1993 | Clary .......................... 235/379 |
| 5,359,667 | A | * | 10/1994 | Borowski et al. ........... 382/138 |
| 5,444,794 | A | * | 8/1995 | Uhland, Sr. .................. 705/45 |
| 6,125,196 | A | * | 9/2000 | Carey et al. ................. 382/138 |
| 6,556,188 | B1 | * | 4/2003 | Cordner ....................... 345/173 |

* cited by examiner

*Primary Examiner*—Anand Bhatnagar
(74) *Attorney, Agent, or Firm*—Ronald Reichman; Angelo N. Chaclas

(57) ABSTRACT

A method of processing checks includes obtaining first information relating to the checks that is compiled by an operator using a calculator, such as by scanning a calculator tape, wherein the first information includes a first number of first dollar amounts, each of which corresponds to a respective one of the checks. The method further includes scanning the checks to create a plurality of check images, obtaining from the check images a second number of second dollar amounts, each corresponding to a respective one of the check images, determining whether the first number is equal to the second number, and providing an error indication if the first number does not equal the second number (which is an indication that a misfeed has occurred).

10 Claims, 3 Drawing Sheets

METHOD FOR PROCESSING CHECKS PRIOR TO ELECTRONIC DEPOSIT

FIELD OF THE INVENTION

The present invention relates to check processing, and in particular to a method for processing checks prior to electronically depositing the checks.

BACKGROUND OF THE INVENTION

Traditionally, businesses have deposited checks received from, for example, customers by physically taking them to a branch of their bank and depositing them over the counter with a teller or dropping them into a night deposit box. The actual physical presentation of checks to be deposited was necessary because, under prior banking laws, the depository bank had to present the original of each check to the corresponding paying bank in order to clear the check. This changed in October of 2004 with the enactment of The Check Clearing for the $21^{st}$ Century Act, commonly referred to Check 21. Check 21 removed the legal requirement that an original paper check had to be presented to obtain payment. Instead, banks can now use digital images to transport check data from the bank of first deposit to the paying bank. Thus, depositors now have the option of depositing checks electronically. In particular, when a depositor wishes to deposit one or more checks, an operator, such an accounts receivable clerk, may scan each of the paper checks to be deposited using some type of a digital scanner to create an image of each check. The check images may then be transmitted electronically to the bank of first deposit. If any downstream bank, such as the paying bank, cannot process a check image, the image can be printed, according to certain specifications, to create what is known as a substitute check, which is the legal equivalent of the original paper check. Check 21 has thus opened the door for remote check deposit solutions wherein check images, rather than original paper checks, are used to make deposits, thereby enabling businesses to eliminate trips to the bank. In addition, the use of check images also reduces check transportation costs among banks and improves funds availability.

Check scanners, such as those currently used by most banks and similar institutions to processes paper checks, are notorious for misfeeds, also called masked feeds, wherein two are more checks are fed at the same time (one check masks the other(s)), resulting in only one of the fed checks being scanned. For traditional paper check deposits, the potential for misfeeds presents a problem because, without some safety mechanism, there is the danger that not all of the depositor's checks will be processed (deposited) by the receiving bank. As a result, depositors, when making a traditional paper check deposit, have typically included a safety mechanism with their deposit in the form of a calculator tape that lists the amount of each check (and possibly an associated account number or portion thereof) and the total amount to be deposited. The calculator tape may then be used by the receiving bank to ensure that all of the checks are properly processed. Misfeeds are also likely to present a significant problem for remote check deposit solutions because, as described above, a check scanner (similar to those currently used by most banks and similar institutions) must be used up front by the depositor to generate an image of each check being deposited. Thus, there is a need for a method for processing checks prior to electronically depositing the checks that provides safeguards against misfeeds during check image generation.

SUMMARY OF THE INVENTION

The present invention provides a method of processing a plurality of checks prior to, for example, depositing the check with a bank of first deposit. The method prevents problems associated with scanner misfeeds by detecting the possibility of a misfeed prior to depositing the checks electronically. The method takes advantage of the current practice of generating a calculator tape prior to any check deposit. The method includes obtaining first information relating to the checks that is compiled by an operator using a calculator, wherein the first information includes a first number of first dollar amounts, each of which corresponds to a respective one of the checks. The method further includes scanning the checks to create a plurality of check images, obtaining from the check images a second number of second dollar amounts, each corresponding to a respective one of the check images, determining whether the first number is equal to the second number, and providing an error indication if the first number does not equal the second number (which is an indication that a misfeed has occurred).

The method may further include determining whether each of the first dollar amounts matches a respective one of the second dollar amounts if the first number is equal the second number. In such as case, if it is determined that each of the first dollar amounts does not match a respective one of the second dollar amounts, the method may further include using character recognition to read a first recognized dollar amount from each of the check images and assign a confidence level to each of the first recognized dollar amounts, determining whether it is not possible, using character recognition with one of the first dollar amounts acting as a hint, to read a second recognized dollar amount having a confidence level that is greater than or equal to a predetermined level from any one the check images having a confidence level assigned thereto that is below the predetermined level, and providing a second error indication if it is determined that it is not so possible.

Preferably, the step of obtaining first information relating to the checks includes receiving a calculator tape including the first information, scanning the calculator tape to generate a calendar tape image, and using character recognition to read the first information from the calendar tape image. Alternatively, the step of obtaining first information relating to the checks may include receiving a calculator tape including a barcode including the first information, scanning the calculator tape to generate a calendar tape image and reading the first information from the barcode. As a further alternative, the step of obtaining first information relating to the checks may include electronically receiving the first information from the calculator.

The step of obtaining from the check images a second number of second dollar amounts preferably includes using character recognition to read the second dollar amounts from the check images. The first information may include at least a portion of an account number associated with each of the first dollar amounts.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the inven-

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
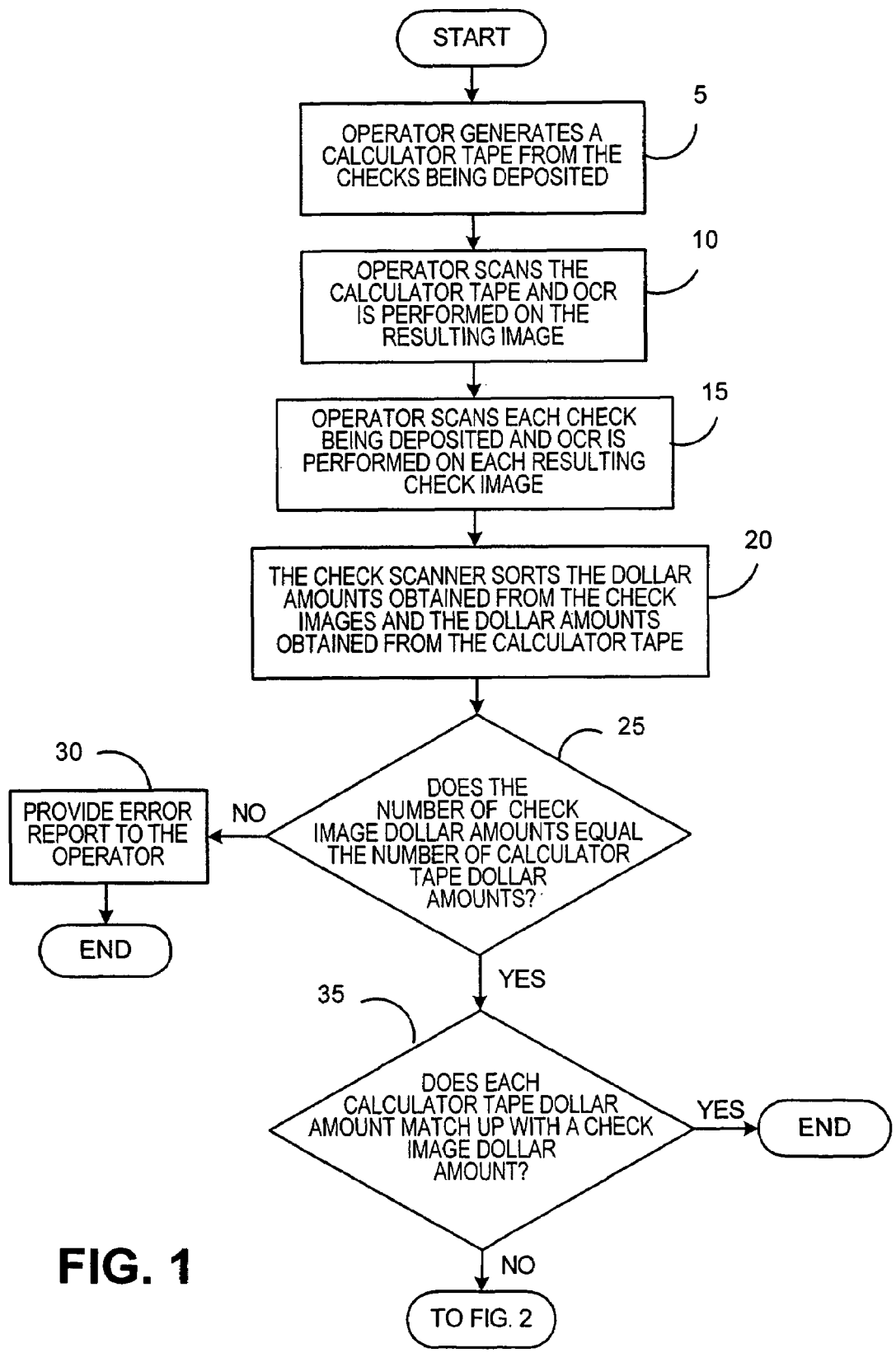
FIGS. 1 and 2 are a flowchart showing a method of processing checks prior to electronically depositing the checks according to one embodiment of the present invention.

FIG. 1 is a flowchart showing a method of processing checks prior to electronically depositing the checks with an upstream processor, such as a bank of first deposit, according to one embodiment of the present invention. The method shown in FIG. 1 contemplates the use of a scanning device that includes a processing unit, a memory and a digital scanner, wherein the device is specifically designed or adapted, typically through software additions or modifications, to provide the functionality of the method described herein. A number of suitable scanning devices (that may be adapted as described herein) are known and commercially available and may include, for example, the TS220E scanner sold by Digital Check Corporation of Northfield Ill. In addition, the scanning device is preferably provided with optical character recognition (OCR) software for use as described herein. Preferably, the OCR software includes special OCR software that is commonly referred to as courtesy amount recognition (CAR) software and legal amount recognition (LAR) software. The CAR/LAR software is able to obtain from a check image the courtesy amount (which is the numerical dollar amount written on the check) and the legal amount (which is the dollar amount of the check written out in words). CAR/LAR software is well known in the art, and is commercially available from a number of different vendors such as Wausau Financial Systems and A2iA Corp. As will be appreciated, the CAR/LAR software will likely need to be modified or adapted to perform the functions of the present invention described herein. As an alternative, the scanning device may not be provided with OCR software, but instead any OCR processing that is described herein may be performed by a remote server that is in communication with the scanning device. In such a case, the scanning device would send images to the remote server and would receive in return the OCR data.

Figure 3A:
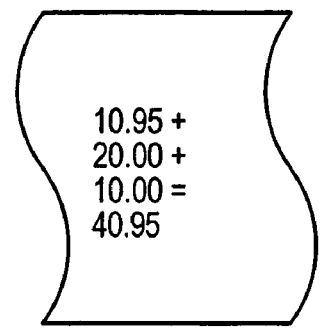
FIGS. 3A, 3B, and 3C show various embodiments of a calculator tape that may be used in conjunction with the present invention.

The method begins at step 5, where an operator, such as an accounts receivable clerk, responsible for depositing a group of checks generates a calculator tape for the deposit using a known commercially available calculator device. One example of such a tape is shown in FIG. 3A. As seen on the tape, the deposit in question includes three checks totaling $40.95. At step 10, the operator scans the calculator tape generated in step 5 using the scanning device to create an electronic image thereof. In addition, the scanning device performs an OCR on the image using the software described above to obtain the dollar amount of each check being deposited (each being referred to as a calculator taper dollar amount).

Figure 3B:
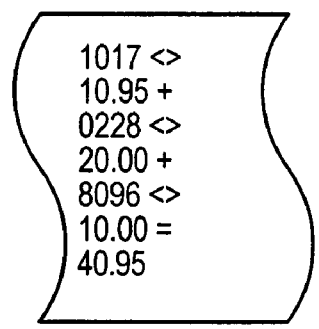
Figure 3C:
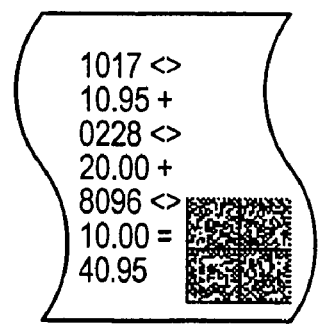

In one embodiment, the calculator tape may be inserted into a transparent sleeve, such as a sleeve made of vinyl, prior to being scanned to make for a more rigid item that is easier to transport through the scanning device. In another embodiment, the calculator may be provided with custom paper stock that approximates the weight and size of check stock to make the "tape" generated on that stock easier to handle by the scanning device, which typically will be designed for typical check stock. In yet another embodiment, the calculator tape that is generated is of the type that allows an operator to include a "memo" numbers as part of the running total, which are typically the last four digits of the account on which each check is drawn. An example of such a tape is shown in FIG. 3B. In still a further embodiment, a specialized calculator may be used that is able to create a two-dimensional, machine readable barcode, wherein the barcode includes all of the check entries and the total. In this case, the scanning device may obtain the check information from the tape by reading the barcode as opposed to or in addition to performing OCR. An example of such a tape is shown in FIG. 3C. As yet another alternative, instead of a calculator tape being printed and scanned to obtain the check information, that information, once entered into the calculator, may be provided electronically to the scanning device, such as through a wired or wireless (e.g., Bluetooth or infrared) connection.

Returning to FIG. 1, at step 15, the operator scans each check being deposited to create an electronic image thereof by feeding the check into the scanning device. As noted above, with many scanning devices, there is a chance that one or more of the checks will be misfed such that an image of one or more of the checks will not be created. In addition, the scanning device performs an OCR on the image, preferably using CAR/LAR software, to obtain the dollar amount of each check being deposited (each being referred to as a check image dollar amount). As described above, the OCR processing may be performed remotely on the images captured by the scanning device.

At step 20, the scanning device then sorts the calculator tape dollar amounts and the check image dollar amounts, preferably in ascending order based on value, although other orders may be used. In the embodiment where the calculator tape includes the account number memos, the sort is preferably by account number first and then by check amount (e.g., ascending). Alternatively, this sorting step may be omitted altogether. Then, at step 25, a determination is made as to whether the number of calculator tape dollar amounts matches the number of check image dollar amounts. If the answer is no, then that is an indication that there has been a misfeed or that the operator has scanned too many or too few checks or has incorrectly tallied the checks, and an error report is provided to the operator in step 30 and the method ends. Preferably, the report is a detailed report which tells the operator nature of the mismatch. In one embodiment, after a number mismatch error is detected, the calculator tape dollar amounts may be compared to the check image dollar amounts to determine which of the calculator tape dollar amounts do not have a matching check. Those dollar amounts may be reported to the operator.

Figure 2:
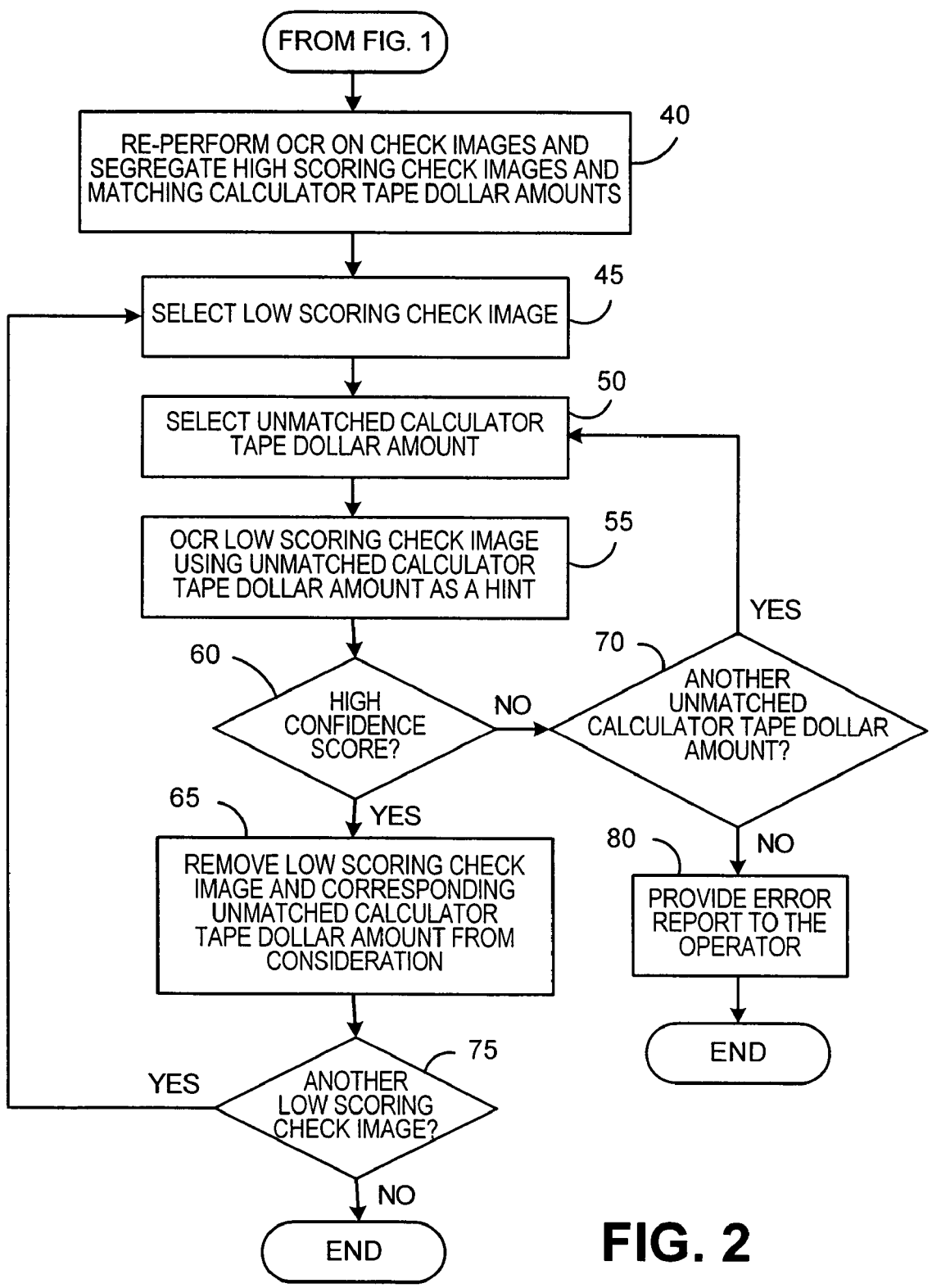

If the answer at step 25 is yes, meaning that there is no number mismatch (i.e., there is an equal number of calculator tape dollar amounts and check image dollar amounts), then, at step 35, a determination is made as to whether each calculator tape dollar amount matches up with a check image dollar amount (i.e., the values are the same for each). If the answer is yes, then the method ends as the checks are ready for electronic deposit (or any further processing to be performed prior to electronic deposit). If, however, the answer at step 35 is no, then a series of steps, shown in FIG. 2, are performed to determine whether the discrepancies between calculator tape dollar amounts and check image dollar amounts can be rectified. In the embodiment where the calculator tape includes the account number memos, both the account number and the check image dollar amount may be used in the comparisons.

As is known, most OCR software provides a confidence score each time it performs a read operation which indicates a relative confidence, typically expressed as a percentage, in the accuracy of the item being read, such as a dollar amount obtained from a check image. Thus, at step 40, the scanning device once again performs an OCR on each of the check images to obtain a check image dollar amount for each. In addition, the OCR software scores the confidence of each read. Again this may be done remotely as described above. Also, this may be done both locally at the scanning device with a low cost version of OCR software and remotely with a higher quality OCR software package if low confidence is obtained locally. Based on the confidence score for each, the check image dollar amounts having a high confidence score associated therewith are segregated from those having a low confidence score associated therewith (referred to as the high scoring check image dollar amounts and the low scoring check image dollar amounts, respectively, for convenience). According to an aspect of the invention, a predetermined score value is used to separate high confidence from low confidence. For example, a confidence score of 85% or higher may be considered to be high confidence and a confidence score of less than 85% may be considered to be low confidence. These values may be set by each different depositor as they deem fit. Each calculator tape dollar amount that matches a high scoring check image dollar amount is removed from consideration. In addition, the remaining calculator tape dollar amounts (i.e., those not corresponding to a high scoring check image dollar amount) are grouped together as a collection of what are referred to as unmatched calculator tape dollar amounts. Also grouped together are the check images that produced a low confidence score, referred to as low scoring check images.

The method then proceeds to step 45, wherein a first one of the low scoring check images is selected for evaluation. Next, at step 50, one of the unmatched calculator tape dollar amounts is selected. In step 55, the selected low scoring check image and unmatched calculator tape dollar amount are provided to the OCR software. The OCR software, and in particular the CAR/LAR software, again attempts to read the amount from the selected low scoring check image, but this time it uses the obtained calculator tape dollar amount as a hint. What this means is that, during a read, the OCR software calculates the probability that each digit of the amount being read is a specific value based on recognition and context (that is agreement between the legal and courtesy amounts). If the probabilities are about the same for two or more digits, the calculator tape dollar amount will be used to try to increase the probability for one of the digits. For example, if the actual check amount is $1.00, the CAR/LAR software score may score the read equally between $1.00 and $7.00, because the legal amount is not recognizable. If the obtained calculator tape dollar amount currently being used as a hint is $1.00, then the score for $1.00 will be increased. Step 55 will result in another check image dollar amount and another confidence score being provided for this read attempt.

At step 60, a determination is made as to whether that confidence score qualifies as a high confidence score (i.e., is it greater than the predetermined threshold value?). If the answer at step 60 is yes, then, at step 65, the current low scoring check image and corresponding current unmatched calculator tape dollar amount are removed from consideration. If the answer at step 60 is no, meaning that the confidence score is not sufficiently high notwithstanding the hint, then, at step 70, a determination is made as to whether there are any remaining unmatched calculator tape dollar amounts that have not yet been used as a hint. If the answer at step 70 is yes, then the method returns to step 50, wherein the next unmatched calculator tape dollar amount is obtained for use as a hint. Thus, as will be appreciated, steps 50, 55, 60, 65 and 70 will result in one or more of the unmatched calculator tape dollar amounts being used as a hint in an attempt to improve the confidence score of the character recognition performed on the low scoring check image.

At step 75, a determination is made as to whether there are any low scoring check images remaining that have not yet been processed. If the answer is yes, then the method proceeds to step 45, wherein the next low scoring check image is selected and is further processed as described above. If, however, the answer at step 75 is no, meaning that all of the low scoring check images have been processed, then the method ends. Returning to step 70, if the answer is no, meaning that all of the unmatched calculator tape dollar amounts have been used as a hint and none of them have resulted in a sufficiently high confidence score, then, at step 80, an error report is provided to the operator indicating that not all of the calculator tape dollar amounts can be matched up with a corresponding check that was scanned, at which time the operator can examine the check and calculator tape for errors. Thus, as will be appreciated, the steps of FIG. 2 determine whether each check that was scanned can, with hints, be matched with one of the calculator tape dollar amounts. If they can, then the checks are ready for electronic deposit (or any further processing to be performed prior to electronic deposit). However, as soon as it is determined that one of the checks cannot be so matched, an error report is provided to the operator (steps 70 and 80), and there is no need to process any remaining low scoring check images.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, while the method of processing has been described herein as being used prior to depositing checks electronically, it may also be used to process checks prior to other types of downstream check processing. Accordingly, the invention is not to be considered as limited by the foregoing description but is only limited by the scope of the appended claims.

What is claimed is:

1. A method of processing a plurality of checks, comprising: using a server to perform the steps of:
   obtaining first information relating to said checks, said first information being compiled by an operator using a calculator and including a first number of first dollar amounts, each of said first dollar amounts corresponding to a respective one of said checks;
   scanning said checks to create a plurality of check images;
   obtaining from said check images a second number of second dollar amounts, each of said second dollar amounts corresponding to a respective one of said check images;
   determining whether said first number is equal to said second number, wherein if said first number is equal said second number said method further comprises determining whether each of said first dollar amounts matches a respective one of said second dollar amounts, and if it is determined that each of said first dollar amounts does not match a respective one of said second dollar amounts said method further comprises:

using character recognition to read a first recognized dollar amount from each of said check images and assign a confidence level to each of said first recognized dollar amounts;

determining whether it is not possible, using character recognition with one of said first dollar amounts acting as a hint, to read a second recognized dollar amount having a confidence level that is greater than or equal to a predetermined level from any one the check images having a confidence level assigned thereto that is below said predetermined level;

providing a second error indication if it is determined that it is not possible, using character recognition with one of said first dollar amounts acting as a hint, to read a second recognized dollar amount having a confidence level that is greater than or equal to said predetermined level from any one the check images having a confidence level assigned thereto that is below a predetermined level; and providing an error indication if said first number does not equal said second number.

2. The method according to claim 1, further comprising segregating the check images having a confidence level assigned thereto that is above the predetermined level and matching ones of said first dollar amounts prior to said step of determining whether it is not possible, using character recognition with one of said first dollar amounts acting as a hint, to read a second recognized dollar amount having a confidence level that is greater than or equal to the predetermined level from any one the check images having a confidence level assigned thereto that is below the predetermined level, wherein said matching ones of said first dollar amounts are not used as hints.

3. The method according to claim 1, wherein said step of obtaining first information relating to said checks includes:
receiving a calculator tape including said first information;
scanning said calculator tape to generate a calculator tape image; and using character recognition to read said first information from said calendar tape image.

4. The method according to claim 1, wherein said step of obtaining from said check images a second number of second dollar amounts includes using character recognition to read said second dollar amounts from said check images.

5. The method according to claim 1, further comprising sorting said first dollar amounts and said second dollar amounts prior to said determining step.

6. The method according to claim 5, wherein said sorting includes placing said first dollar amounts in ascending order and said second dollar amounts in ascending order.

7. The method according to claim 1, wherein said step of obtaining first information relating to said checks includes electronically receiving said first information from said calculator.

8. The method according to claim 1 wherein said first information includes at least a portion of an account number associated with each of said first dollar amounts.

9. The method according to claim 8, further comprising sorting said first dollar amounts and said second dollar amounts prior to said determining step, said first dollar amounts being sorted according to the at least a portion of an account number associated with each.

10. The method according to claim 1, wherein said step of obtaining first information relating to said checks includes:
receiving a calculator tape including a barcode, said barcode including said first information;
scanning said calculator tape to generate a calendar tape image; and reading said first information from said barcode.

* * * * *

UNITED STATES PATENT AND TRADEMARK OFFICE
CERTIFICATE OF CORRECTION

PATENT NO. : 7,609,873 B2  Page 1 of 1
APPLICATION NO. : 11/295979
DATED : October 27, 2009
INVENTOR(S) : Foth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Twelfth Day of October, 2010

David J. Kappos
*Director of the United States Patent and Trademark Office*